Sept. 2, 1924.

C. A. HELLMANN 1,506,832

ELECTRICAL CIRCUIT CONTROLLER

Filed June 3, 1920

Carl A. Hellmann,
Inventor.

Patented Sept. 2, 1924.

1,506,832

UNITED STATES PATENT OFFICE.

CARL A. HELLMANN, OF WASHINGTON, DISTRICT OF COLUMBIA.

ELECTRICAL-CIRCUIT CONTROLLER.

Application filed June 3, 1920. Serial No. 386,198.

*To all whom it may concern:*

Be it known that I, CARL A. HELLMANN, a citizen of the United States, residing at Washington, D. C., have invented a new and useful Electrical-Circuit Controller, of which the following is a specification.

The object of my invention is to provide an electrical circuit controller or lamp flasher which may be manufactured easily and cheaply, which is substantial and rugged in construction, capable of a wide variation in the nature and number of circuits controlled thereby, and reliable in action, and which requires practically no attention in operation.

A further object is to provide a circuit controller capable of controlling certain circuits in such apparently erratic manner as to lead a casual observer to believe that the effect is not produced by a periodic mechanical flasher, because of the apparent lack of regularity in functioning of various circuits.

A further object is to utilize the periodic motion of one or more pendulums to control circuits either separately or jointly or to control circuits partly separately and partly jointly, the respective individual circuits being actuated at intervals dependent on the periods and phase relations of the pendulums.

A further object is to provide means to cause the pendulums to be maintained in oscillation automatically, as long as desired.

Other objects and advantages of the invention will appear upon reference to the following specification and the accompanying drawing, wherein some of the forms which my invention may take are disclosed.

In said drawing:
Fig. 1 illustrates the controller in a simple form.

Figs. 14, 15, 16, and 17 show further modified arrangements of contacts.

It will be understood, of course, that all these figures are purely diagrammatic, and that no attempt is made to show relative dimensions of the parts except in a most general way, the illustrations serving merely to show the principles of construction and operation of the devices.

The expression "characteristic circuit" as used in the present specification means a circuit distinguished from other circuits in its periods of action and inaction. For instance, two or more circuits connected in parallel to a controller, while they would be, in one sense, distinct circuits, would nevertheless be opened and closed strictly in unison by the controller, and hence would not be different characteristic circuits.

Figure 1:
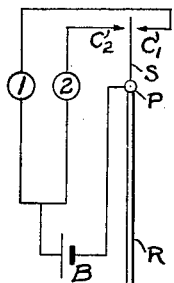
Figure 12:
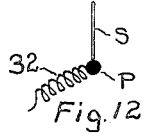
Fig. 12 shows diagrammatically one way of making the connection from the source of current to the pendulum.

One of the simplest forms of controller, as shown in Fig. 1, comprises a pendulum having a bob W carried by a rod R pivoted at P and actuating a contact element, here shown as a spring S extending upward from the rod R. Obviously, it is not necessary that this element be a spring or that it extend upward, but these features are convenient and also admit of clearer representation on the drawing. The pendulum is set in oscillation in any way, as by imparting motion to the bob by hand and will continue to oscillate about pivot P for a time dependent upon the resistance met by the pendulum in its motion, the mass of the pendulum, and the amount of energy imparted thereto. This simple form of pendulum is capable of being made very easily and cheaply, but of course has the disadvantage of being incapable of continued operation if left to itself. The contact spring S when the bob swings to the left, completes a circuit from one pole of the battery B, through pivot P, spring S, contact $C_1$, translating device 1, and back to the other pole of the battery B, thus actuating the device 1, here shown as a lamp, by way of example. Upon oscillation of the pendulum bob to the right, translating device 2, which may be of the same character as device 1, or of other character, will be actuated similarly. Thus devices 1 and 2 are actuated alternately, with intervening periods of inaction, while the spring S is not in contact with either $C_1$ or $C_2$. The battery B may be connected to spring S in any desired way, as well known in the art, one way being shown in Fig. 12. Here a coil-spring 32 of fine copper wire is electrically connected to the pendulum rod R at or near the pivot P, so as to produce only slight motion of the coil spring and therefore introduce only slight frictional resistance due to this cause. I have used, for example, a coil of No. 36 B. & S. gage copper wire for this purpose, consisting of a spring made by winding say twenty turns of such wire about a one-quarter inch rod as a former. Such a spring is very weak and easily deflected, hence has no appreciable effect in destroying the motion of the pendulum, yet has sufficient electrical conductivity to conduct the small currents used without undue electrical resistance. The source of electricity B is preferably of low voltage to avoid excessive sparking at the contacts, although of course any well known type of spark preventing or reducing means may be connected to the contacts if higher voltages are to be used. Ordinarily B will be a low voltage battery, and no excessive sparking will be encountered at the contacts as the current is usually also small. By making the spring S very thin it also will oppose but slight resistance to the motion of the pendulum, and will even restore some energy to the pendulum during each oscillation so that the total loss of energy due to the spring is only that consumed by the internal friction of its material. The pivot P may of course be of any well known type, such as knife edge, torsion, point-and-cone, etc. as well known in the clock-pendulum art. The connection may of course be made to the pendulum through the knife edge elements themselves, but this is an uncertain type of contact and not only tends to give faulty electrical connection, but also tends to roughen the bearing elements due to the sparking, and thus increases the friction.

The device shown in Fig. 1 may be considerably improved by employing a pendulum of the well known "Kater" type usually found in metronomes. A great disadvantage of the pendulum shown in Fig. 1 is its relatively great length. For instance, a seconds-pendulum of this type would be over three feet in length, thus being unwieldy and not readily portable. This disadvantage is overcome by providing a pendulum of the type shown in Fig. 2. Here the rod R, which is preferably made of metal or other heavy material, carries a bob W adjustably secured thereon, as by a clamping means 13, whereby the center of gravity of the pendulum may be shifted relatively to the pivot P, here shown remote from either end of the rod R. A pendulum of this type can be made much shorter for a given period of oscillation, and said period can be adjusted readily through a wide range (theoretically, there is no limit to the slowness of oscillation for any pendulum of this type, no matter how long, on appropriate adjustment of the bob or bobs) by shifting the bob W along the rod. To secure additional adjustment, an auxiliary bob $w$ is likewise adjustably secured to the rod R, by means of clamp 14 and may of course be placed at any desired position along said rod (above or below the pivot) and the period of the pendulum may thus be adjusted very accurately to any desired value within the limits of the device, the period increasing as the center of gravity approaches the pivot P and decreasing as it recedes therefrom. This feature of accurate adjustment of the period is of importance as will be explained in connection with Fig. 6.

Figure 2:
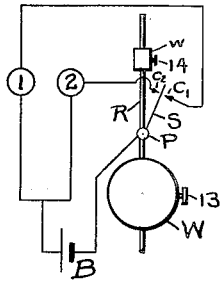
Fig. 2 illustrates a modified form of construction which is much more compact and capable of a wide range of adjustment of period.
Figure 3:
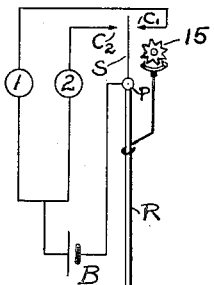
Fig. 3 illustrates a mechanical means whereby the oscillation of the pendulum may be sustained.

Fig. 3 shows the pendulum provided with a mechanically driven escapement device 15 of the type usual in clocks and the like whereby the pendulum may be kept in sustained oscillation for any desired length of time. The electrical connections in Figures 2 and 3 are exactly the same as in Fig. 1, and are designated by the same reference characters. While the contact S in Fig. 2 is shown offset to the right of the pivot P, this is done for convenience of illustration only, and no limitation as to the placing of the said contact is to be inferred therefrom.

Figures 4, 5:
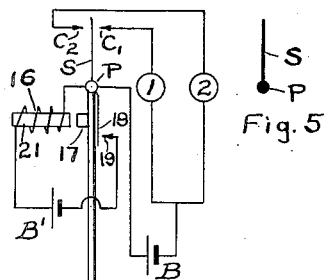
Fig. 4 illustrates an electrical means for sustaining the oscillation.
Fig. 5 represents a conventional symbol which is used in some of the succeeding figures, to simplify the latter and to avoid confusion, and represents a periodically oscillated contact means, such as is embodied in Figs. 1 to 4 for instance, and it will be understood that the presence of this symbol in the other figures presupposes the presence of an actuating means for the same.
Figure 11:
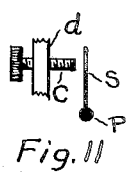
Fig. 11 shows diagrammatically an adjustable contact.

Fig. 4 differs from Fig. 3 in substituting an electrical actuating device to operate the pendulum in place of the escapement. It may be stated here that while for simplicity of illustration Figs. 3 and 4 show pendulums of the type shown in Fig. 1, ordinarily it will be preferred to employ the Fig. 2 type of pendulum otherwise arranged and actuated as shown in Figs. 3 and 4. The Fig. 4 type has in addition to the features shown in Figs. 1 or 2 an electro-magnetic motor comprising elements 16, 17, 18, and 19, a magnetic field being produced by coil 16 whenever current from the battery B' flows therethrough and element 17 being attracted into this field. Coil 16 may or may not have a magnetic core 21, and in the absence of such core will act as a solenoid, in either case attracting element 17 into its field. Ordinarily such core will be preferred, as it greatly strengthens the magnetic field and thus requires less electrical energy to operate the pendulum. Upon motion of the pendulum toward coil 16 due to the attraction, the current will finally be interrupted by separation of the contacts 18 and 19, and further attraction will cease. The pendulum will thus be set in oscillation much as is the clapper of an ordinary electric bell. The battery B' although shown distinct from battery B, for simplicity of illustration, may be, and preferably is, battery B or such part thereof as may be desirable, to properly actuate the motor, that is, a tap may be taken off from the appropriate point of the battery B to provide the proper voltage, as is well known in the art. The contacts $C_1$ $C_2$ etc., are adjustable toward and from the element S and this adjustment may be provided in any desired way, for example as shown in Fig. 11, the current lead being connected to a metallic element $d$ through which contact screw C is threaded, to approach or recede from element S. Element $d$ is usually secured to a stationary portion of the framework or support to which the pendulum is pivoted. This adjustment of the contacts is desirable to control the times of making and breaking the circuits controlled by the device.

Figures 6, 7, 8, 9:
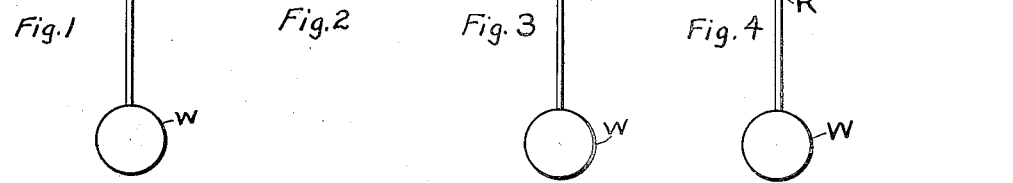
Fig. 6 shows connections which may be employed to control eight or less characteristic circuits by means of two controllers.
Fig. 7 shows another way of connecting circuits to the controller.
Fig. 8 shows an amplification of the device shown in Fig. 7, whereby a single controller operates four characteristic circuits.
Fig. 9 shows how relays may be used in cooperation with a controller.

A plurality of pendulum circuit controllers may be combined as shown for instance, in Fig. 6, which shows two such controllers, S P and S' P' arranged to cooperate in the control of eight independent characteristic circuits. Of course, any number of circuits, arranged in series or parallel with each other, may be connected to the same two terminals on the controller, and all such circuits would be actuated properly, but not independently. For example the lamps shown in Fig. 9, while each is in an independent circuit, eleven such circuits in all being shown, really constitute only two independent characteristic circuits. In Fig. 6, the poles of the battery B are connected one to each pendulum pivot, P and P'. Six conductors lead from the controller, from terminals P, P', $C_1$, $C_1'$, $C_2$ and $C_2'$ respectively. The lamps are connected as follows: Lamp 1 lights when contact $C_1$ is closed. Lamp 2 when $C_2$ is closed. Lamp 3 when $C_1'$ is closed. Lamp 4 when $C_2'$ is closed. Lamp 5 when $C_1$ and $C_1'$ are simultaneously closed. Lamp 6 when $C_2$ and $C_2'$ are simultaneously closed. Lamp 7 when $C_1$ and $C_2'$ are simultaneously closed. Lamp 8 when $C_2$ and $C_1'$ are simultaneously closed. These connections are clearly shown and may be readily traced on the figure. If the two controllers be adjusted to have slightly different periods, the pendulums will gradually change their phase relations to each other, and will thus pass periodically through all possible phase relations thus causing the contacts likewise to be made and broken in periodic sequence. The result however is an apparently erratic flashing of the lamps, many of which seem to operate without regular sequence. These circuits have been used in Christmas tree lighting, thirty-two small low voltage lamps having been used, connected in eight characteristic circuits with four lamps in series in each such circuit, the effect produced resembling that of fireflies in the apparent lack of regularity of the flashes. Special attention is directed to the beforementioned fact that only six conductors are needed to control the eight circuits, thus simplifying the wiring necessary. Ordinarily eight circuits will provide sufficient variety in the action of the lamps, but if more are desired, further controllers may be connected to the same battery and lamp circuits connected as already explained between the several contacts C and the battery poles or the pivots P. Any number of controllers may be used, as will be obvious, and if these be adjusted to have different periods, an almost endless variety of effects may be produced. It will also be obvious that it is not essential that all eight circuits be present as certain ones may be omitted if desired without affecting the rest.

Fig. 7 shows still another way in which the circuit controller may be used. A single contact controller is here illustrated, controlling two lights, 2 and 20 respectively. When the contact $C_2$ is open, lamps 2 and 20 are connected in series with each other and with the battery B. If lamp 20 be a small lamp, and lamp 2 a larger one, the current will light lamp 20 to full brilliance while lamp 2 scarcely glows, while when the contact $C_2$ is closed the lamp 20 is short-circuited and therefore goes out, whereas the lamp 2 now receives the full voltage of the battery and burns with normal brilliance.

Fig. 8 shows substantially the same arrangement as Fig. 7, except that a double contact controller having contacts $C_1$ $C_2$ is provided, thus controlling four lamps, 1, 10, 2 and 20.

Fig. 9 shows a relay 22 connected so as to be actuated when contact $C_2$ is closed, whereby said relay will attract its armature 23 and thus close circuit 11 through generator 12, and connect circuit 9 with said generator instead of circuit 11 whenever contact $C_2$ is open. In this way the controller may be used to actuate circuits having higher voltages and currents than would ordinarily be obtained from battery circuits. This arrangement may be used for electric signs and the like. In this figure contact $C_1$ is shown idle, but of course may control a similar relay, if desired, or may control any other circuit such as shown for instance in. the other figures.

Figure 10:
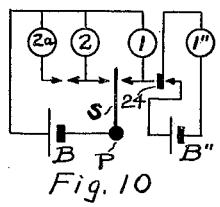
Fig. 10 shows a different arrangement of contacts whereby several circuits may be operated successively by a controller.

Fig. 10 shows a pendulum controlling circuits 1 and 1″ successively on one side, and circuits 2 and $2^a$ successively on the other side. The contacts are carried on flexible conductors arranged first to make contact with S, and then to be further deflected into contact with the other contacts. The circuit 1″ is entirely independent of the circuit 1 and has an independent source of current B″, an insulating member 24 serving to prevent electrical contact if desirable to do so, between the circuits. The other circuits 1, 2 and $2^a$ as shown have a common source of energy, B, but are otherwise independent. Of course the contacts shown to the right of the pendulum may be the same as those to the left, or vice versa, as may be desirable in any particular case, and more than two circuits may be provided by correspondingly changing the number of contacts on each or either side of the pendulum, the principle of operation remaining the same.

Fig. 11 is a diagrammatic representation of one of the contacts C, showing how adjustment is provided to alter the distance of the contacts $C_1$ $C_2$ etc., of the other figures, from the pendulum contact member S or S′. It will be understood that all the contacts shown in the figures are preferably adjustable, and preferably in the manner shown in Fig. 11. The connection to the contact C is made through stationary conducting member $d$ in the ordinary way.

Figure 13:
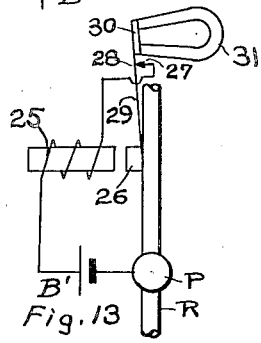
Fig. 13 shows a magnetic means to ensure proper action of the contacts which control the pendulum-actuating electro-magnetic means, of the type shown in Fig. 4 for example.

Fig. 13 shows diagrammatically one way of causing the energization and de-energization of the pendulum actuating magnet to take place at the proper times to correctly sustain the motion of the pendulum. The usual "electric bell" type of vibrating motor is employed, having an electro-magnet 25, armature 26, stationary adjustable contact 27, and flexible movable contact device 28. These parts when connected in circuit with battery B′ as shown, would operate in the same way as does the ordinary electric bell arrangement. It was found, however, that there is a tendency of the pendulum to fail to oscillate correctly, and of the armature merely to buzz at a comparatively high frequency, instead of carrying the pendulum with it at the period of vibration corresponding to the pendulum oscillation. This may be due to the slight yielding of the pendulum device, sufficient to break the circuit at 27, 28, whereupon a return motion again completes the circuit, this being repeated rapidly. While it is possible to prevent this action by correct adjustment of contact 27, it may be prevented also by providing a magnet 31, preferably of the permanent type, adjacent an armature 30, at the end of flexible conductor 29. Upon a swing of the armature 30 to the right, it will be attracted to the poles of magnet 31 and held there by said magnet, until the pendulum swings far enough in the other direction to tear it away from the magnet 31, when it immediately flies off, and thus breaks the circuit of the electro-magnet 25, thus causing the pull of the electro-magnet 25 upon armature 26 to cease. By this means the pendulum receives a properly timed impulse, starting, say, at one end of its swing, and stopping at some time during said swing, and not an improperly timed one such as would be given by the Fig. 4 arrangement, and the tendency to "buzz" is entirely eliminated.

Figure 14:
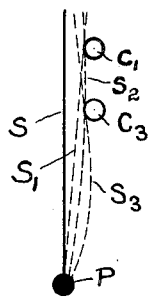
Figure 15:
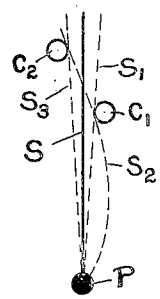
Figure 16:
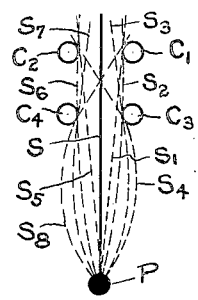
Figure 17:
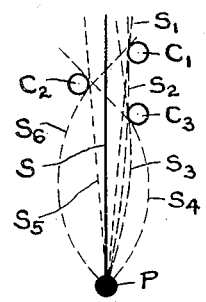

Figs. 14, 15, 16, and 17 show how novel effects may be obtained by different arrangements of contacts $C_1$ $C_2$ $C_3$ and $C_4$ in cooperation with element S. It will be understood, of course, that these contacts are connected to control corresponding circuits, as indicated in the preceding figures. In Fig. 14, on motion of element S to the right, contact $C_1$ is first reached, as shown at $S_1$; further motion connects both $C_1$ and $C_3$ to S simultaneously as shown at $S_2$; still further motion disconnects $C_1$ from S while $C_3$ remains connected as shown at $S_3$. Upon the reverse oscillation of S, these contact phenomena take place in the reverse order. In Fig. 15, upon motion of S to the right, $C_1$ is reached first, as shown at $S_1$; then both $C_1$ and $C_2$ as shown at $S_2$; then the reversal of swing of S, first $C_2$ is disconnected, then $C_1$ is disconnected; then after a short time $C_2$ alone is connected, as shown at $S_3$; then upon reversal, both are again disconnected, thus completing the cycle, which is repeated periodically as long as the device is in operation. In Fig. 16 the contacts are, in a similar way, actuated in the order: $C_1$; $C_1$ and $C_3$; $C_3$; $C_2$ and $C_3$; $C_3$; $C_1$ and $C_3$; $C_1$; all off; $C_2$; $C_2$ and $C_4$; $C_4$; $C_2$ and $C_4$; $C_4$; $C_2$ and $C_4$; $C_2$; all off; these changes repeating themselves in the order named for the respective positions of the contact members, $S_1$; $S_2$; $S_3$; $S_4$; $S_3$; $S_2$; $S_1$; S; $S_5$; $S_6$; $S_7$; $S_8$; $S_7$; $S_6$; $S_5$; S. Finally, in the form shown in Fig. 17, the order is $C_1$; $C_1$ and $C_3$; $C_3$; $C_2$ and $C_3$; $C_3$; $C_1$ and $C_3$; $C_1$; all off; $C_2$; $C_1$ and $C_2$; $C_2$; all off; for the positions $S_1$; $S_2$; $S_3$; $S_4$; $S_3$; $S_2$; $S_1$; S; $S_5$; $S_6$; $S_5$; and S, respectively, and in the order named.

It will be seen from the above that the device is susceptible of almost endless variations in the circuit controlling functions, and that it may be embodied in numerous forms, a few of which have been illustrated and described, and it is therefore to be understood that the invention is not limited to the particular forms herein disclosed.

What I claim as my invention is:

1. In a device of the kind described, a periodically movable element, means for moving said element, a flexible contact member actuated by said element, a plurality of adjustable contacts arranged to cooperate with the flexible contact member, whereby the contacts are engaged successively and whereby certain of the contacts act as secondary pivots for the flexible member, to vary its contact action with respect to others of the contacts.

2. In a periodic contact mechanism, a pendulum, a flexible contact member actuated thereby, a plurality of adjustable contacts arranged to cooperate with the flexible contact member, whereby the contacts are engaged successively and whereby certain of the contacts act as secondary pivots for the flexible member, to vary its contact action with respect to others of the contacts.

3. In a device of the kind described, periodically movable members carrying electrical contacts, and substantially stationary contacts adjacent the movable contacts, whereby said movable contacts may periodically engage corresponding ones of the stationary contacts, simultaneous engagement of certain of the stationary contacts with their cooperating movable contacts being adapted to control circuits.

4. In a device of the kind described, periodically movable members carrying electrical contacts, and substantially stationary contacts adjacent the movable contacts, whereby said movable contacts may periodically engage corresponding ones of the stationary contacts, engagement of a stationary contact with its cooperating movable contact being adapted to control a corresponding circuit, and simultaneous engagement of certain of the stationary contacts with their cooperating movable contacts being adapted to control other corresponding circuits.

5. A plurality of movable contact members; a corresponding number of means for periodically moving said members; and a plurality of adjustable stationary contacts cooperating with each movable contact member, certain of the stationary contacts being electrically connected, whereby a number of characteristic circuits greater than the number of stationary contacts may be controlled.

6. Two pendulums; a movable contact carried by each pendulum and adjustable stationary contacts cooperating with each movable contact, certain of the stationary contacts being electrically connected whereby more than four characteristic circuits may be controlled.

7. In a device of the kind described, a plurality of pendulums; an electrical contact actuated by each pendulum; and a plurality of contacts adjacent the contact actuated by the corresponding pendulum, whereby said pendulum-actuated contact may alternately engage the latter contacts, at least one of said pendulums being of an adjustable period type.

CARL A. HELLMANN.